(12) United States Patent
Vaney et al.

(10) Patent No.: US 9,126,572 B2
(45) Date of Patent: Sep. 8, 2015

(54) METHOD OF MANAGING THE BRAKING OF AN AIRCRAFT

(71) Applicant: MESSIER-BUGATTI-DOWTY, Velizy-Villacoublay (FR)

(72) Inventors: Jean-Baptiste Vaney, Velizy-Villacoublay (FR); David Frank, Velizy-Villacoublay (FR); David Lemay, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/132,484

(22) Filed: Dec. 18, 2013

(65) Prior Publication Data

US 2014/0180505 A1    Jun. 26, 2014

(30) Foreign Application Priority Data

Dec. 21, 2012    (FR) .................................... 12 62714

(51) Int. Cl.
| | |
|---|---|
| G01C 23/00 | (2006.01) |
| B60T 8/17 | (2006.01) |
| B60T 8/26 | (2006.01) |
| B64C 25/42 | (2006.01) |
| B60T 7/04 | (2006.01) |
| B60T 8/172 | (2006.01) |
| B60T 8/32 | (2006.01) |
| B60T 17/22 | (2006.01) |
| B60T 8/00 | (2006.01) |

(52) U.S. Cl.
CPC ............... *B60T 8/1703* (2013.01); *B60T 7/042* (2013.01); *B60T 8/00* (2013.01); *B60T 8/172* (2013.01); *B60T 8/26* (2013.01); *B60T 8/325* (2013.01); *B60T 17/221* (2013.01); *B64C 25/426* (2013.01)

(58) Field of Classification Search
USPC ............................................ 701/3, 8, 13, 120
See application file for complete search history.

(56) References Cited

U.S. PATENT DOCUMENTS

| | | | | |
|---|---|---|---|---|
| 5,217,282 | A * | 6/1993 | Guichard | ..................... 303/9.73 |
| 5,417,477 | A | 5/1995 | Lasbleis | |
| 2005/0231030 | A1 * | 10/2005 | Frank | ............................ 303/126 |
| 2006/0186267 | A1 | 8/2006 | Steiner et al. | |
| 2008/0201025 | A1 | 8/2008 | Dellac et al. | |
| 2011/0226569 | A1 | 9/2011 | Devlieg | |

FOREIGN PATENT DOCUMENTS

| | | |
|---|---|---|
| EP | 0 329 373 A1 | 8/1989 |
| EP | 0 443 213 A2 | 8/1991 |
| EP | 0 498 714 A1 | 8/1992 |

(Continued)

OTHER PUBLICATIONS

French Search Report for French Application 12 62714 dated Sep. 2, 2013.

*Primary Examiner* — Kim T Nguyen
(74) *Attorney, Agent, or Firm* — Sughrue Mion, PLLC

(57) ABSTRACT

A method of managing the braking of an aircraft, the aircraft having a plurality of wheels R1, . . . , R12, each fitted with a brake F1, . . . , F12 adapted to generate a braking force in response to brake pedals 5 being depressed. The management method comprising the steps of: distributing the wheels fitted with respective brakes in at least two distinct groups G1, G2, G3, G'1, G'2, G'3; allocating respective relationships to each of the groups of wheels for determining how braking force varies as a function of the depression of the brake pedals; and modifying the distribution of the wheels in response to a predetermined event occurring.

6 Claims, 1 Drawing Sheet

(56) References Cited

FOREIGN PATENT DOCUMENTS

| | | | |
|---|---|---|---|
| EP | 0 610 115 A1 | 8/1994 | |
| EP | 1 588 912 A1 | 10/2005 | |
| FR | 2 898 333 A1 | 9/2007 | |
| WO | 94/20344 A1 | 9/1994 | |
| WO | 96/08396 A1 | 3/1996 | |
| WO | 2010/088396 A1 | 8/2010 | |

* cited by examiner

METHOD OF MANAGING THE BRAKING OF AN AIRCRAFT

The invention relates to a method of managing low-speed braking of an aircraft, in order to improve passenger comfort and to limit brake wear.

CROSS REFERENCE TO RELATED APPLICATIONS

This application claims priority from French Patent Application No. 12 62714, filed on Dec. 21, 2012, the contents of all of which are incorporated herein by reference in their entirety.

BACKGROUND OF THE INVENTION

While an aircraft is taxiing at low speed, i.e. other than during stages of takeoff and landing, its braking needs to be managed in such a manner as to take various constraints into account, including passenger comfort.

In order to improve passenger comfort, it is desirable for braking to be both progressive and accurate. Braking that is progressive makes it possible to avoid the passengers feeling decelerations that are too sudden. At low speed, braking that is accurate is important for comfort, since it serves to avoid the pilot being tempted to act repeatedly on the pedals, e.g. while maneuvering the aircraft in response to instructions from a ramp agent and when confronted with residual engine thrust. The state of the art is illustrated in particular by Document FR 2 701 006, which describes a method of controlling an electro-hydraulic brake device in an aircraft wheel set. While the aircraft is taxiing at low speed, that method consists in separately organizing braking for the wheels of first and second distinct groups of braked wheels, using respective relationships for pressure variation that is controlled as a function of the extent to which brake pedals are depressed, each group of wheels having its own function. A first relationship applies over the entire active range of brake pedal depressions, while a second relationship applies only above a certain predetermined depression threshold for said pedals. Use is then made of a number of brakes that increases as a function of the requested level of braking, thus making it possible to ensure that braking is progressive and accurate, and therefore comfortable.

That method presents a certain number of drawbacks. In the event of a brake being unavailable, e.g. when equipment involved in controlling the brake has failed, the effectiveness of the braking that results from the remaining brakes is quite clearly diminished. Furthermore, in the event of one or more brakes presenting temperature or wear greater than the other brakes, the method does not make it possible to reduce that temperature or wear difference.

Object of the Invention

An object of the invention is to provide a method similar to that described above, but not presenting the above-mentioned drawbacks.

SUMMARY OF THE INVENTION

In order to achieve this object, the invention provides a method of managing the braking of an aircraft, the aircraft having a plurality of wheels, each fitted with a brake adapted to generate a braking force in response to brake pedals being depressed, the management method comprising the steps of:

distributing the wheels fitted with respective brakes in at least two distinct groups; and allocating respective relationships to each of the groups of wheels for determining how braking force varies as a function of the depression of the brake pedals.

According to the invention, the method further comprises the step of modifying the distribution of the wheels in response to a predetermined event occurring.

Thus, in the event of the brake of a wheel being unavailable, it is possible to distribute the other wheels in its group in other groups, so as to conserve satisfactory braking effectiveness. Modifying the distribution also makes it possible to limit the stress to which the brake of a wheel is subjected, and this is advantageous when the brake is unavailable or when it presents a level of temperature or wear that is high compared with the other brakes. Under such circumstances, the wheel is allocated to a group that is itself allocated to a relationship for subjecting the brake to as little stress as possible.

BRIEF DESCRIPTION OF THE DRAWING

The invention can be better understood in the light of the following description given with reference to the figures of the accompanying drawing, in which.

DETAILED DESCRIPTION OF THE INVENTION

Figure 1:
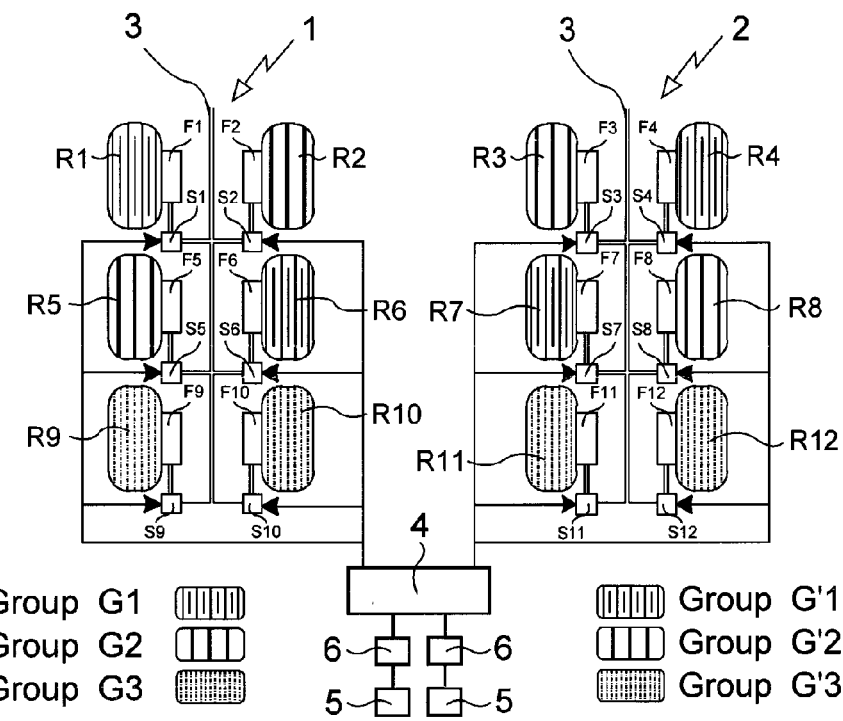
FIG. 1 is a diagrammatic view of the wheels of two main undercarriages of an aircraft in which the method of the invention for managing braking is implemented.

With reference to FIG. 1, the braking management method of the invention in this implementation is used in an aircraft having twelve-wheel landing gear, the wheels being carried by two main undercarriages 1, 2. The wheels of the first main undercarriage 1 are referenced R1, R2, R5, R6, R9, and R10, and the wheels of the second main undercarriage 2 are referenced R3, R4, R7, R8, R11, and R12.

Each wheel R1, ..., R12 is fitted with a respective electro-hydraulic brake F1, ..., F12 that is actuated by an associated hydraulic servovalve S1, ..., S12. Each servovalve is fed with fluid by a hydraulic circuit 3 and is electrically controlled by control means 4. The servovalves are controlled as a function of the extent to which brake pedals 5 are depressed (there being two of them in this example). To do this, each brake pedal 5 is associated with a depression sensor 6 that transforms the angle of inclination of the pedal 5, i.e. the extent to which it is depressed, into an electric signal that is representative of its depression. The control means 4, which are electrically connected to the depression sensors 6, are adapted to interpret the electric signals delivered by the depression sensors 6 and to control the servovalves S1, ..., S12 as a function of the angles of inclination of the pedals. Thus, the controlled pressure, and hence the braking force generated by the brakes, are functions of the extent the brake pedals are depressed.

While the aircraft is taxiing at low speed, i.e. at less than a predetermined speed threshold (e.g. 70 km/h or 80 km/h), the control means 4 activate the method of managing the braking of the aircraft that comprises the steps of:

distributing the wheels of the undercarriages 1, 2 into three distinct groups for each undercarriage 1, 2, the groups being given the following references G1, G2, and G3 for the first undercarriage 1, and G'1, G'2, and G'3 for the second undercarriage 2; and allocating respective relationships L1, L2, L3 to each of the groups of wheels for determining how braking force is to vary as a function of the depression of the brake pedals.

Thus, at an initialization moment M0, which corresponds for example to switching on the control means 4 while the brakes of the wheels are in a nominal state, i.e. while the brakes are functional and present relatively similar levels of temperature and wear, the wheels of each undercarriage are distributed among the groups using the following distribution:

the group G1 of the first undercarriage contains the wheels R1, R6, the group G2 contains the wheels R2, R5, and the group G3 contains the wheels R9, R10; and the group G'1 of the second undercarriage contains the wheels R3, R8, the group G'2 contains the wheels R4, R7, and the group G'3 contains the wheels R11, R12.

At the moment M0, the relationship L1 is allocated to the groups G1, G'1, the relationship L2 is allocated to the groups G2, G'2, and the relationship L3 is allocated to the groups G3, G'3.

It should be observed that in order to make braking uniform, it is advantageous to allocate the central wheels R5, R6, and R7, R8 of the undercarriages 1, 2 the different groups. Specifically, the central wheels are often less loaded than the front and rear wheels, and are thus likely to start skidding at lower controlled levels of braking force.

It should also be observed that the groups define a distribution that is symmetrical about a longitudinal midplane of the aircraft and about an axis of each undercarriage (each wheel group produces drag that is symmetrical about said plane and said axis), which is favorable for maintaining good steerability and to reducing twisting forces applied to the undercarriages.

Finally, it should be observed that, although the relationships L1, L2, and L3 are similar, they are applied to the groups G1, G2, G3 and G'1, G'2, G'3 of the two undercarriages 1, 2 in independent manner. In the description below, consideration is given solely to performing the braking management method of the invention on the wheels R1, R2, R5, R6, R9, and R10 of the first undercarriage 1 and to the groups G1, G2, G3 to which they are allocated, with the entire description below being applicable in identical manner to the wheels of the second undercarriage 2 and to the groups G'1, G'2, G'3 to which they are allocated.

Figure 2:
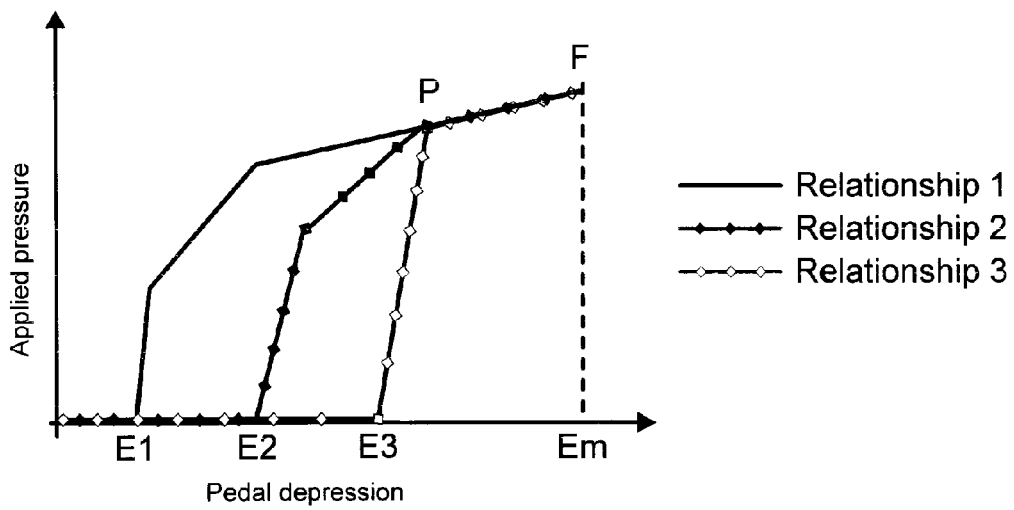
FIG. 2 shows three different pressure-variation relationships for varying the amount of pressure that is applied as a function of the extent to which brake pedals are depressed, the relationships being allocated to groups of wheels among which the wheels of the aircraft are distributed.

The relationships L1, L2, L3, as shown in FIG. 2, are continuously increasing functions F1, F2, F3 that define applied pressures, and thus applied braking forces, starting from distinct minimum thresholds E1, E2, E3 of pedal depression, where E1 is less than E2, that is itself less than E3. A braking force is thus generated from the moment when the brake pedals are depressed to a degree that is greater than or equal to the threshold of the corresponding relationship. The threshold E1 is quite low but not zero, e.g. it may be about 15%. The function F1 remains greater than the function F2, which itself remains greater than the function F3, until all three functions join together at a point P, beyond which all three functions remain equal up to a point F corresponding to maximum depression Em of the pedals.

In order to perform braking at low speed, using an increasing number of brakes as a function of the extent to which the pedals are depressed (four up to E2, then eight up to E3, and thereafter twelve) makes it possible to ensure that braking is progressive and accurate, and thus comfortable. The brakes controlled in application of the relationships L1 and L2, i.e. four out of six brakes, must be capable of generating a braking force equal to the force that would normally be generated by six brakes. Thus, each of these brakes generates a braking force that is relatively large when it is in use.

Provision is made to alternate the allocation of the relationships to the groups automatically on each occasion that braking is interrupted, i.e. each time the pedals are released after being depressed by an amount less than a predetermined small value, so that each group of brakes is operated in succession in application of a different relationship. This serves to ensure that the wear and the temperature of the brakes are more uniform.

The management method of the invention also includes a step of modifying the distribution of the wheels in response to detecting, on one or more wheels referred to as "singular" wheels:

unavailability of the brake;

the brake having a temperature that is high compared with the temperatures of the other brakes; and/or the brake having a degree of wear that is high compared with the wear of the other brakes.

In the event of a brake of a singular wheel in a certain group being unavailable, e.g. because of a malfunction of the servovalve associated with the brake or because of a problem in the hydraulic circuit, then the other wheel in that group is put into one of the other groups that remain, and the relationships L1 and L2 are allocated to the remaining groups. The relationship L3 is then no longer used. For example, in the event of the brake F6 of the wheel R6 becoming unavailable, then the wheel R1 is put into the group G2, and the relationship L1 is allocated to the group G2 and the relationship L2 is allocated to the group G3. Thereafter, the allocation of the relationships L1 and L2 to the groups G2 and G3 is alternated automatically on each occasion that braking is interrupted.

Braking is then a little less accurate and progressive compared with when all of the brakes are available, however it is just as effective for the pedals being depressed by up to E2. The braking is a little less effective for the pedals being depressed by more than E2, since only five out of six of the brakes are in operation, whereas all six brakes would be operating in this range of depressions before the brake F6 became unavailable.

In the event of two brakes of two singular wheels in different groups becoming unavailable, then the distribution of the wheels is modified by placing both of the singular wheels having brakes that are unavailable in one group to which the relationship L3 is allocated, and by placing the remaining wheels in two groups that are allocated to the relationships L1 and L2. For example, in the event of the brakes F1, F10 of the wheels R1 and R10 becoming unavailable, the group G2 is retained, the group G1 is made up using the wheels R6 and R9, and the group G3 is made up using the wheels R1 and R10. Thereafter, the allocation of the relationships L1 and L2 is alternated between the groups G1 and G2, with the relationship L3 always being used for the group G3. Braking is thus just as effective for pedal depressions of up to E2, and the resulting braking force is equal to two-thirds of the nominal braking force for depressions greater than E2.

In the event of detecting that the brakes of two singular wheels present levels of temperatures or of wear that are high compared with the other brakes, then the distributions and the relationships are allocated to the wheels in the same way as described above. In the event of the brakes of the wheels R1 and R10 presenting excessive temperature or wear, the group G1 is made up with the wheels are R6 and R9, the group G2 is made up with the wheels R2 and R5, and the group G3 is made up with the wheels R1 and R10. Thereafter, the allocation of the relationships L1 and L2 is alternated between the groups G1 and G2, with the relationship L3 always being used for the group G3. Thus, since the brakes of the wheels in the group G3 are used less than the others (they are used only for depressions greater than E2), the temperature or wear differences between these brakes and the other brakes will decrease.

The invention is not limited to the particular embodiment described above, but on the contrary it covers any variant coming within the ambit of the invention as defined by the claims.

Although the invention is described with reference to wheels having electro-hydraulic brakes, it is naturally possible to apply the invention to brakes that are electromechanical. The relationships L1, L2, and L3 that are used will naturally be adapted, but they continue to define variations in braking force that increase continuously in response to depressing brake pedals, and to define different minimum thresholds for brake pedal depression from which a braking force begins to be applied.

Although the landing gear described has twelve wheels mounted on two main undercarriages and distributed in three groups, the braking management method of the invention may be performed on an aircraft having some other number of wheels that are distributed in some other number of groups.

Although a certain initial distribution is proposed for organizing the wheels in groups, this initial distribution could naturally be different. For the first undercarriage, a first group could be made up of the wheels R1, R5, and R9, and a second group could be made up of the wheels R2, R6, and R10. It is also possible to form groups with different undercarriage wheels. A first group could be made up of the wheels R1, R2, R7, and R8, and a second group could be made up of the wheels R3, R4, R5, and R6.

The relationships L1, L2, L3 are provided purely by way of illustration, and they could naturally be defined in other ways (in particular document FR 2 701 003 describes other relationships).

Provision could also be made to modify the distribution of the wheels in a different manner, e.g. by having a group to which there are allocated a wheel for which the brake is unavailable and a wheel for which the brake is at a temperature that is too high.

Likewise, it is possible to make provision for modifying the distribution in response to the occurrence of different events, e.g. detecting that a wheel has a tire with pressure or temperature that is high compared with the pressures or the temperatures of the other wheels.

The invention claimed is:

1. A method of managing the braking of an aircraft, the aircraft having a plurality of wheels (R1, . . . , R12), each fitted with a brake (F1, . . . , F12) adapted to generate a braking force in response to brake pedals (5) being depressed, the management method comprising the steps of:
   distributing the wheels fitted with respective brakes in at least two distinct groups of wheels (G1, G2, G3, G'1, G'2, G'3);
   allocating respective distinct relationships (L1, L2, L3) to each of the groups of the wheels for determining how the braking force varies as a function of the depression of the brake pedals; and
   modifying the distribution of the wheels in the at least two distinct groups in response to a predetermined event occurring.

2. A braking management method according to claim 1, wherein each relationship (L1, L2, L3) defines a different minimum threshold (E1, E2, E3) for brake pedal depression from which the braking force is applied.

3. A braking management method according to claim 1, wherein the step of modifying the distribution of the wheels is performed in response to detecting, on at least one wheel referred to as a "singular" wheel, at least one of:
   unavailability of the brake;
   the brake having a temperature that is high compared with temperatures of the other brakes;
   the brake having a high degree of wear compared with wear of the other brakes;
   a tire having a temperature that is high compared with temperatures of other tires; and
   a tire having a pressure that is high compared with pressures of other tires.

4. A braking management method according to claim 3, wherein a wheel of a group including a singular wheel having its brake unavailable is allocated to one of the other groups.

5. A braking management method according to claim 4, wherein the singular wheel is allocated to a group that has allocated thereto a relationship defining a highest minimum threshold for brake pedal depression.

6. A braking management method according to claim 3, wherein the singular wheel is allocated to a group that has allocated thereto a relationship defining a highest minimum threshold for brake pedal depression.

* * * * *